UNITED STATES PATENT OFFICE.

HARRY D. RANKIN, OF OAKLAND, CALIFORNIA, ASSIGNOR OF SEVEN-TENTHS TO LOUIS SLOSS, OF SAN FRANCISCO, CALIFORNIA.

PROCESS OF DECOMPOSING, TRANSPOSING, DISSOLVING, OR RENDERING SOLUBLE DIFFICULTLY-SOLUBLE BODIES.

1,364,804.     Specification of Letters Patent.     Patented Jan. 4, 1921.

No Drawing.     Application filed June 26, 1918. Serial No. 242,123.

*To all whom it may concern:*

Be it known that I, HARRY D. RANKIN, a citizen of the United States, and a resident of Oakland, county of Alameda, and State of California, have invented a certain new and useful Process of Decomposing, Transposing, Dissolving, or Rendering Soluble Difficultly-Soluble Bodies, of which the following is a specification.

The invention relates to a process of decomposing, transposing, dissolving, internally rearranging or rendering soluble difficultly soluble or commercially insoluble bodies, such as metals, ores, minerals, concentrates, slimes, waste material or other bodies, whether in the raw state or in the roasted, fused, leached or otherwise treated state.

An object of the invention is to produce a commercial process for internally rearranging, decomposing, transforming, dissolving or rendering soluble, materials or bodies which are difficultly soluble or commercially insoluble.

A further object of the invention is to provide a process for accomplishing the above results in a short time and at a relatively small expense.

The invention possesses other advantageous features, some of which, with the foregoing, will be outlined in full in the following description, where I shall describe that species of the invention which I have selected for description. While I shall describe one specific form of my generic invention, it is to be understood that I do not limit myself to such form, because the invention may be embodied in a multiplicity of forms, each being a species of my invention.

By the process of my invention I transform, decompose, dissolve or render soluble, bodies in the natural state heretofore considered technically insoluble in sulfuric, hydrochloric or nitric acid or combinations thereof, such as magnetic oxid of iron ($Fe_3O_4$), tin dioxid ($SnO_2$), all manganese oxids ($Mn_2O_3$), ($MnO_2$), etc., chromite oxids ($FeOCr_2O_3$), silicates of copper, of nickel, of zinc, of potassium and of other metals, barium sulfate ($BaSO_4$), cinnabar (HgS) and other sulfids, as well as ignited, sintered, roasted, melted, smelted, leached or otherwise treated ores or substances, such as ignited ferric oxid, ignited alumina, ferrites, alloys, certain molecular compounds and other unusual and difficultly soluble bodies, all classes of which have heretofore been considered as practically insoluble.

Different materials are employed for accomplishing the internal rearrangement or dissolution of different heretofore commercially insoluble materials, and the effect of the materials is to produce an acid action.

Materials may be used to produce a sulfuric acid action alone, a hydrochloric acid action alone, a nitric acid action alone, or an action due to the combination of any or all of these acids. The material which produces the hydrochloric acid action may be employed in connection with magnetic oxid of iron, serpentine, manganese oxids, silicates of copper, nickel or zinc, chromites, ferrites, mica, alloys and other substances. The material which produces the sulfuric acid action has a greater field of use than any other material as far as I am at present aware.

The practical value of the process lies in the fact that these difficultly soluble bodies and compounds contain simple substances, such as valuable metals, acid forming substances, alloys, oxids, salts and acids or compounds and other substances which have not heretofore been commercially recoverable, unless first fused, or only partly recoverable, resulting in either case in unprofitable treatment.

These difficultly soluble bodies, or I might say, commercially insoluble bodies, have heretofore been partially dissolved only in laboratory tests and the invariable analytical proceeding has been to subject the body in an open beaker or other vessel to a large excess of sulfuric acid at its boiling temperature, under normal pressure for variable periods of time, approximating several hours. The amount of acid employed, according to text books, is between 3 and 5 c. c. for one gram of material, so that a large excess of acid is always present, and under these conditions, a small proportion of the material may be dissolved. This analytical process, however, is entirely impractical for commercial use, because in such use it would require enormous vessels, large space and a great amount of time. Some of these materials, for example ($Mn_2O_3$)

and ($CuSiO_3 2H_2O$) and some sulfids as those of antimony or bismuth, etc., without first fusing, are slightly and slowly soluble in a large excess of dilute sulfuric acid. Those that are, without fusing, practically not soluble at all in dilute sulfuric acid, such as ignited ferric oxid, alumina, etc., potassium and other silicates, chromites, titanates, cobalt, nickel and other sulfids are totally lost. Some of these materials, without fusing, are slowly and slightly soluble in strong sulfuric acid as formerly applied, such as heavy spar, chromite, copper sulfid, etc. Some, without fusing, for all practical purposes are not soluble at all in strong sulfuric acid as formerly applied, such as cassiterite, orthoclase, muscovite, mercuric sulfid, etc. Even if a large excess of fuming sulfuric acid is used under the old conditions, but little more action takes place and the process is not commercial.

By the process of my invention, all of these materials are readily decomposed, dissolved or rendered soluble in economic time, in economic quantities and at economic expense without fusing or even sintering.

In accordance with my invention I mix the ore, substance or material to be dissolved or rendered soluble or partly soluble, with a salt which when heated decomposes and forms an acid, and heat the mixture in a closed vessel so that the mixture is subjected to the action of temperature and pressure, the pressure being preferably between 20 and 60 pounds per square inch, although a higher pressure may be employed. The temperature to which the mixture is heated is sufficient to decompose the salt and the mixture is maintained at that temperature and preferably agitated during the time in which reaction occurs. This temperature varies from approximately 350° to 850° centigrade for the different salts used. The conditions of high temperature and pressure are maintained, and in a short time, the length of which varies with the materials, there will be created a very concentrated solution of acid and some oxids, acids, salts and other changed forms of the material being acted upon. Continuing, the mixture soon assumes the consistency of a pasty mass, and when in this condition, dissociation and decomposition of the heretofore considered insoluble material rapidly takes place. The high temperature and pressure and hence concentration of the acting masses before mentioned, which is obtained during the pasty mass stage, is required to pass the transition point in internal rearrangement. The corrosive or internal rearrangment action transforms the insoluble base or metallic compounds into water soluble sulfates when a salt is used which produces the sulfuric acid action, into chlorids when a salt is used which produces the hydrochloric acid action and into nitrates when a salt is used which produces the nitric acid action and these are then recovered by solution in water or other suitable solvent and evaporation. The material is preferably ground very fine before being heated with the salt to insure rapid and complete combination and subsequent dissociation and decomposition of certain of the materials.

To produce the sulfuric acid action alone, the ground ore or material is mixed with a suitable quantity of acid sodium sulfate $NaHSO_4$ or other alkali or alkaline earth bisulfate and the decomposition of this salt due to heat produces sodium pyrosulfate $Na_2S_2O_7$. At the temperature of fusion acid sodium sulfate has a powerful solvent and decomposing action on many substances. When the action of sulfurous acid is desired, sodium acid sulfite $NaHSO_3$ or other alkali or alkaline earth acid sulfite is employed. When a weak sulfuric acid action is desired $NaHSO_4 H_2O$ or other alkali bisulfate may be used. Instead of using the sodium or other alkali or alkaline earth sulfate or bi-sulfate mentioned above, other salts, such as ferric sulfate $Fe_2(SO_4)_3$ or bi-sulfate may be used and when a weaker action is desired a water solution of this salt may be used.

When it is desired to produce a hydrochloric acid action, any suitable chlorid, preferably sodium chlorid, is mixed with the substance together with any of the salts mentioned above in connection with the sulfuric acid action. Of these, however, I prefer to use the acid sodium sulfate or $NaHSO_4 H_2O$. When it is desired to produce a nitric acid action, the same procedure is followed as with the hydrochloric acid action, with the exception, that a nitrate, preferably sodium nitrate, is added instead of the chlorid. When it is desired to produce an action due to the combination of hydrochloric and nitric acids salts of the three acids are used, preferably the sodium salts, such as acid sodium sulfate, sodium chlorid and sodium nitrate. When it is desired to obtain the action of sulfuric acid, acting with either one of the other acids or with both of them, an excess of the acid sulfate is used, or an excess of acid sulfite when an excess of sulfurous acid is desired. These salts or any of them are added to the material to be decomposed in the requisite molecular quantity to produce the reaction desired, or in other words, in sufficient amount to produce an acid or the anhydrid of an acid sufficient to react with the metallic components of the material being treated. The amount of salt or salts required to produce this result will vary with each particular material and must necessarily be determined by analysis.

The mixture of the salt or salts with or without water and the material is heated in a closed vessel or retort to a temperature sufficiently high to decompose the acid sulfate or acid sulfite used, with the consequent development of pressure within the vessel.

Instead of using the above mentioned salts to produce sufficient acid to complete the reaction, they may be employed to give the first acting or carrier acid, and boric acid or other less ionized acid or their acid salts in requisite molecular quantity, may be employed to give the final less ionized compound than the material to be decomposed.

I claim:

1. The process of decomposing, transforming, dissolving or rendering soluble substances heretofore considered practicably insoluble which consists in heating to a temperature of 350° to 850° centigrade and subjecting to pressure in excess of 20 pounds per square inch a mixture of the substance and an alkali or alkaline earth acid salt.

2. The process of decomposing, transforming, dissolving or rendering soluble substances heretofore considered practicably insoluble which consists in subjecting to pressure and heating a mixture of the substance and an alkali or alkaline earth acid sulfate to a temperature sufficiently high to dissociate the sulfate.

3. The process of decomposing, transforming, dissolving or rendering soluble substances heretofore considered practicably insoluble which consists in mixing the substance, an alkali or alkaline earth with acid salt, a chlorid, and a nitrate, and heating the mixture in a closed vessel to a temperature sufficiently high to dissociate the salt.

4. The precess of decomposing, transforming, dissolving or rendering soluble substances heretofore considered practicably insoluble which consists in mixing the substance, an alkali or alkaline earth acid sulfate, a chlorid, and a nitrate, and heating the mixture in a closed vessel to a temperature sufficiently high to dissociate the sulfate.

5. The process of decomposing, transforming, dissolving or rendering soluble substances heretofore considered practically insoluble which consists in heating and subjecting to pressure a mixture of the substance, and acid sodium sulfate, the mixture being heated to a temperature sufficiently high to decompose the sulfate.

6. The process of decomposing, transforming, dissolving or rendering soluble substances heretofore considered practicably insoluble which consists in mixing the substance, an alkali or alkaline earth acid salt and a nitrate, and heating the mixture to a temperature sufficiently high to dissociate the salt.

In testimony whereof I have hereunto set my hand at San Francisco, California, this 17th day of June, 1918.

HARRY D. RANKIN.

In presence of—
  H. G. PROST.